United States Patent [19]

McGann et al.

[11] 4,357,193
[45] Nov. 2, 1982

[54] METHOD OF FABRICATING A COMPOSITE STRUCTURE

[75] Inventors: Timothy W. McGann, Anaheim; William G. Olsen, Whittier, both of Calif.

[73] Assignee: Rockwell International Corporation, El Sequndo, Calif.

[21] Appl. No.: 40,799

[22] Filed: May 21, 1979

[51] Int. Cl.³ .............................................. B29C 17/00
[52] U.S. Cl. .................................................... 156/286
[58] Field of Search ................... 156/286, 285, 87, 287

[56] References Cited

U.S. PATENT DOCUMENTS

| | | | |
|---|---|---|---|
| 1,211,487 | 1/1977 | Price | 156/286 X |
| 1,335,124 | 3/1920 | Midgley | 156/382 X |
| 3,202,561 | 8/1965 | Swanson | 156/286 X |
| 3,769,132 | 10/1973 | Cram | 156/286 |

Primary Examiner—David A. Simmons
Attorney, Agent, or Firm—Charles T. Silberberg

[57] ABSTRACT

A method of fabricating a composite structure wherein a porous laminate comprised of a plurality of plies of fibrous material in an uncured resin matrix has entrapped air expelled. In carrying out the method, the laminate is positioned in an evacuable chamber. Vacuum is applied to the chamber to create a partial vacuum environment therein. The laminate is heated to within a temperature range wherein the resin matrix exhibits a viscosity which allows air migration through the resin matrix. The laminate is maintained within the temperature range for a time duration sufficient to expell entrapped air. The laminate can then be cured using vacuum to compress the laminate.

26 Claims, 6 Drawing Figures

METHOD OF FABRICATING A COMPOSITE STRUCTURE

BACKGROUND OF THE INVENTION (a) Field of the Invention

This invention generally relates to a method of fabricating a composite structure. More specifically, the invention relates to a method of fabricating a composite laminate comprised of a plurality of plies of fibrous material in an uncured resin matrix wherein voids in the laminate are substantially eliminated by expelling air entrapped in the laminate without the use of an autoclave.

(b) Description of the Prior Art

The present invention is concerned with fiber reinforced composite materials. As is well known to those versed in the art, a fiber reinforced composite normally consists of a resinous matrix sheet reinforced with a plurality of fibers embedded in the matrix. In some cases the reinforcing fibers have a random orientation. In other cases, the reinforcing fibers may have a parallel orientation and may be arranged in a laminate of several layers or plies, each having a parallel fiber orientation, with the fibers in the adjacent layers oriented in the same or different directions to provide a fiber reinforced composite with selected mechanical and thermal expansion properties.

Fiber reinforced composite may comprise various reinforcing fibers and various resins. Fiberglass, Kevlar, boron, and carbon are typical fiber materials. Epoxy and polyimides are typical resins.

As initially formed, these composite sheet materials are flexible and deformable, providing panel-forming members which can be draped or otherwise conformed to various shapes and thereafter cured, by the application of heat and pressure thereto, to tough lightweight, strong panels of permanent shape retention having high performance strength and stiffness characteristics imparted by the reinforcing fibers.

In the curing step, heat applied converts the liquid resin to a solid which bonds the reinforcing fibers into a rigid mass. The curing pressure is necessary to prevent shifting of the fibers during curing and thereby avoid formation of wrinkles in the finished molded article, to compress and expel entrapped air and excess resin from the composite material, and to consolidate the plies to a required thickness.

Typically, curing of fiber reinforced composite laminates has required the use of an expensive autoclave to provide high positive pressure at elevated temperatures. The high pressure has been necessary to remove and compress air entrapped between plies of the composite laminate during the lay-up operation. The air entrapped in the laminate tends to collect between the plies and, unless removed, significantly reduces the interlaminar shear strength and other matrix or resin critical mechanical properties. The application of high positive pressure compresses the laminate and physically forces air therefrom during the cure cycle. However, such high positive pressure also compresses the entrapped air. As such, some of the air may be retained in the laminate. This results in voids in the cured structure. However, if the positive pressure is sufficiently high, e.g., 85–100 psi, void content is significantly reduced, and a satisfactory part results.

While composite parts formed using an autoclave have been satisfactory from a structural standpoint, it has long been desired to replace the use of an autoclave with a vacuum furnace, i.e., an oven and vacuum source. This is basically due to (1) the high cost of autoclaves as compared to conventional ovens and vacuum pumps, (2) high tooling costs, both initial and maintenance, which would be significantly reduced because of both simplification and a decreased severity of the curing conditions, (3) component rejection rates, which would be minimized due to a decrease in the probability of vacuum bag loss by virtue of the reduced pressure differential employed, and (4) production rates, which would be increased due to availability of oven/vacuum pumps relative to autoclaves.

Attempts at vacuum curing composite laminates have not been successful because even in high vacuum, such as $5 \times 10^{-4}$ mm, Hg., compression of the laminate has not been great enough to force sufficient removal of the entrapped air from within the laminate. As such, vacuum cured composite laminates have been highly porous with unsatisfactory mechanical properties.

PRIOR ART STATEMENT

U.S. Pat. Nos. 3,633,267 to Deminet, et al., and 4,013,210 to Deminet disclose a method for making a diffusion bonded structure wherein a metal honeycomb core and metal face sheets are preassembled in a vacuum furnace so as to permit exposure of the surfaces which are to be diffusion bonded. A vacuum is drawn and the assembly heated to near diffusion bonding temperature with the bonding surfaces still exposed to the vacuum environment such that contaminates in the bonding surfaces of the face sheets and core are, at the elevated temperatures employed, boiled off the surfaces and pumped out by virtue of the vacuum environment. This normally occurs between 1000° and 1500° F. (near the diffusion bonding temperature). At the diffusion bonding temperature, the surfaces of the structure can be brought together for bonding more intimately because of the elimination of such contaminants. The surfaces of the structure can then be diffusion bonded together with the application of moderate pressure because of the intimate contact (which allows atom diffusion across the bonding surfaces) resulting from elimination of such contaminates.

U.S. Pat. No. 3,661,675 to Frankowski discloses a method of bonding a sheet or film of polyethylene terithalate to another sheet thereof wherein such sheets are placed in pressure contact with each other in a continuously evacuated environment and are heated to a temperature sufficient to outgas impurities in the sheets and fuse the sheets to the adjacent surface. Like the above patents, this invention relates to the removal of impurities from the surfaces to be bonded by heating to a temperature wherein such impurities are vaporized and then withdrawn by the vacuum.

SUMMARY OF THE INVENTION

It is, therefore, an object of the present invention to provide a method of fabricating a composite structure comprised of a laminate of a plurality of plies of fibrous material in a resin matrix wherein air entrapped in the laminate is expelled such that porosity of the laminate is substantially eliminated.

It is another object of the present invention to provide a method of fabricating a cured fiber reinforced composite structure which has typical high pressure (autoclave) cured mechanical properties without the use of an autoclave.

It is another object of the present invention to provide a method of fabricating a composite structure comprised of a laminate of a plurality of plies of fibrous material in a resin matrix wherein the laminate is outgassed and cured in one operation.

Briefly, in accordance with the invention, there is provided a method of fabricating a composite structure. The structure is comprised of a laminate of a plurality of plies of fibrous material in a resin matrix. The laminate with the resin in an uncured state is positioned in an evacuable chamber. Vacuum is applied to the chamber to create a partial vacuum environment therein. The laminate is heated to within a temperature range wherein the resin matrix exhibits a viscosity which allows air migration through the resin matrix. The laminate is maintained within the temperature range and with compressive pressure thereon substantially precluded for a time duration sufficient to cause air entrapped in the laminate to be expelled. In one embodiment of the invention, the step of curing the laminate is also performed.

Other objects and advantages of the invention will become apparent upon reading the following detailed description and upon reference to the drawings.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Figure 1:
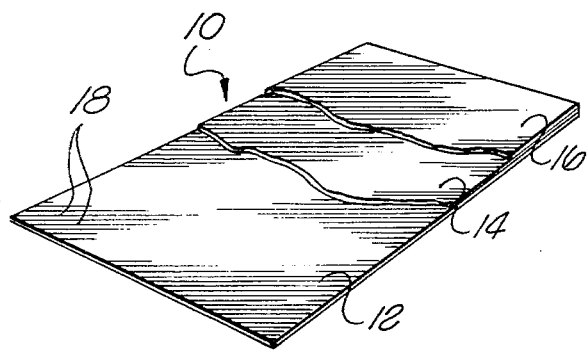
FIG. 1 is a perspective view of a fiber reinforced composite laminate, with portions thereof broken away, such that the direction of the fibers of the plies of the laminate are illustrated.

Referring now to FIG. 1, there is illustrated a fiber reinforced composite laminate generally indicated at 10 to be formed according to the present invention. The laminate 10 is made up of a plurality of sheets or plies which are stacked to a desired thickness to form the laminate. In the example illustrated, laminate 10 is made up of three such plies, 12, 14, and 16. Sheets 12, 14, and 16 are formed from a resin matrix reinforced with fibrous material in the form of continuous, lineally-aligned parallel filaments 18. The fiber material is available commercially in various forms, such as strips, sheets, tape, woven fabric, and the like and impregnated with the desired resin. The sheets 12, 14, and 16 are adhered together by the thickness of the resin matrix. Fibers 18 of sheets 12, 14, and 16 are shown orientated in the same direction. However, for various reasons as previously discussed, the fibers in the different plies can be oriented in different directions. In this regard, see U.S. Pat. No. 3,768,760 to Jensen.

During assembly or lay-up of laminate 10, air becomes entrapped between the plies 12, 14, and 16. Thus, in the uncured state, laminate 10 is quite porous. Without removal of such entrapped air, the laminate as finally formed (after curing) would have a high void content. This significantly reduces the interlaminar shear strength and other matrix or resin critical mechanical properties. To sufficiently remove such entrapped air, it has been necessary in the prior art to compress the laminate under high positive pressure. This has required the use of expensive autoclaves. The present invention obviates this requirement allowing curing to be accomplished in a vacuum furnace or with low positive pressure.

Figure 2:
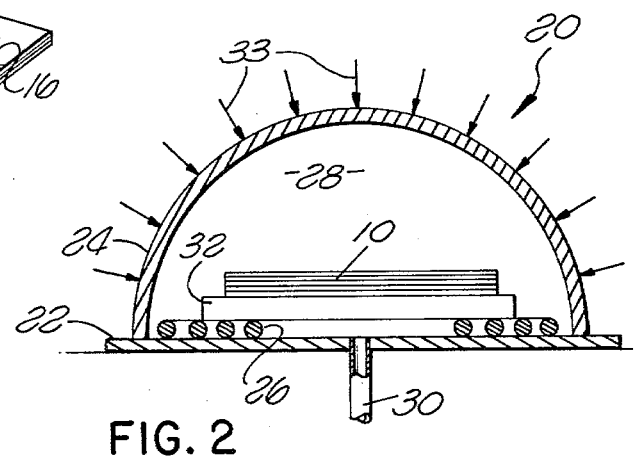
FIG. 2 is a schematic view of a vacuum furnace having the laminate of FIG. 1 positioned therein for expelling entrapped air therefrom in accordance with the present invention.

FIG. 2 illustrates an apparatus generally indicated at 20 for expelling entrapped air (outgassing) from the laminate. Unlike the prior art techniques, where entrapped air is expelled during curing by compressing the laminate, according to the present invention, entrapped air is expelled from the laminate prior to curing.

In FIG. 2, laminate 10 is shown in a chamber 28 resting on a support plate 32. Chamber 28 is defined by a base plate 22 and semispherical rigid housing 24. In apparatus 20 is provided a heating element 26. The chamber 28 within apparatus 20 may be evacuated by a suitable vacuum pump (not shown) through conduit 30.

Unlike prior art curing operations, in the FIG. 2 embodiment laminate 10 is not placed within a vacuum bag. Vacuum bags, which are impermeable and normally formed of nylon or similar plastic wrapping which surrounds the laminate, are used to assure application of uniform compressive pressure to the laminate. Typically, the vacuum bag is evacuated which produces a uniform inward force on the walls thereof by virtue of the surrounding positive pressure. The force is transmitted through the walls of the vacuum bag in a uniform manner to the laminate. Without the use of a vacuum bag, the compression necessary for curing would not be provided as pressures on the laminate 10 would be in equilibrium.

In order to expel entrapped air in laminate 10 according to the present invention, chamber 28 is evacuated and the laminate 10 heated (by mechanism 26) to within a temperature range wherein the resin matrix exhibits a viscosity which allows air migration therethrough. During this time direct consolidation pressure on laminate 10 is precluded. The laminate 10 is maintained within this temperature range for a time duration sufficient to cause air entrapped in laminate 10 to be expelled from the laminate. Normally the dwell time would be of large enough duration such that the entrapped air is substantially eliminated. Such air is drawn by the vacuum pump through the laminate 10 to the edges thereof and out of chamber 28 into line 30.

Only within a specified temperature range will entrapped air within the laminate be able to be withdrawn according to the present method. Thus, below the minimum temperature of this range, the resin will still be in a tacky state and have too high a viscosity for air immersed therein to be withdrawn by application of vacuum to the laminate. However, once the minimum temperature of the range is reached, viscosity of the resin is reduced sufficiently to allow air migration through the resin under application of vacuum to the ends of the laminate 10 where it is drawn off and out of chamber 28. Conversely, exceeding the maximum temperature in the temperature range will cause the resin to solidify and thereby prevent air migration within the resin.

Optimally, laminate 10 would be heated within the specified temperature range to a substantially minimum viscosity temperature, i.e., the temperature at which the resin is in substantially its most fluid state, which would be maintained for the necessary dwell time. Under such conditions, the dwell time would be minimized and removal of entrapped air would be maximized.

Dwell time and the temperature range which allows air migration are dependent upon a number of factors. Among these are the resin chemistry, laminate thickness, laminate configuration, tooling concept, and degree of resin advancement. However, suitable temperature ranges and dwell times can be determined experimentally for any particular component.

A procedure which has been found successful for this determination is to subject the resin to be used to a gradual heat-up from room temperature to about 350° F. while measuring the viscosity of the resin either mechanically using a Brookfield thermocel viscometer, or visually, utilizing a Fisher-Johns melting point apparatus. The maximum temperature in the range is that temperature where gelation of the resin is first seen to occur. The minimum temperature in the range is that temperature where flow of the resin is first observed. The maximum effective temperature of the range would be that temperature where gelation or solidification occurs in the resin after dwelling at said temperature for the minimum time period necessary for substantially complete outgassing of the entrapped air. Minimum viscosity temperature is determined by measuring the viscosity of the resin as previously discussed and observing the temperature at which the resin is most liquid.

While the present invention is primarily concerned with substantially complete outgassing of the laminate, such that the laminate can be cured without use of an autoclave, but still have typical high pressure cured mechanical properties, it should be understood that if some outgassing (less than substantially complete) of the laminate is done according to the present technique, and such laminate vacuum or low positive pressure cured, then the resulting cured laminate will have improved properties (by virtue of less voids) over a vacuum or low positive pressure cured laminate which did not undergo the outgassing step. A cured laminate with such improved (though not optimal) properties may still meet certain design requirements. Accordingly, while not preferred, the present invention encompasses utilizing the outgassing technique described herein to a partial extent, i.e., less than substantially complete. Partial outgassing can be accomplished by dwelling within the range for a time period less than that required to substantially eliminate the entrapped air, by dwelling above the maximum effective temperature, etc.

Within the temperature range, the closer to minimum viscosity temperature, the less dwell time required for outgassing. At the higher temperatures in the range, only a short dwell time is possible because of rapid resin advancement to a solid state. Varying the temperature within the temperature range will vary the dwell time required.

Applicants have discovered that substantially all the entrapped air can be expelled with a dwell time of 30 minutes when a laminate of the materials set out in Table I is maintained within the range from the minimum temperature to the maximum effective temperature while subjected to a standard vacuum of about 25–28 inches Hg. It may be that substantially complete outgassing can be accomplished in less than 30 minutes with such materials, however, this is not known at the present time.

Dwell time ($t_D$) to substantially eliminate the entrapped air for any of the aforementioned temperatures may be determined by dwelling at the desired temperature while monitoring viscosity until resin gelation occurs. The dwell time which is actually used (actual dwell time, $t_{DA}$) will be a selected percentage of the experimentally determined maximum dwell time (experimental dwell time, $t_{DE}$) which provides a margin to accomodate typical resin advancement which occurs as a result of exposure to ambient conditions and slower heat up rates normally associated with production type tooling. Typically this percentage will be about 60 to 65%, but should result in a dwell time no less than about 30 minutes (as presently known for the materials disclosed) in order to assure that entrapped air is substantially eliminated. Some sample figures relative to the above are set forth below in Table I.

TABLE I

| Resin | Min. Outgas Temp./$t_{DA}$ | Max. Outgas Temp./$t_{DE}$ | Optimum Outgas Temperature/$t_{DA}$ | Max. Effective Outgas Temp/$t_{DA}$ |
|---|---|---|---|---|
| Hercules AS/3501-5A | 150° F./45 min. | 280° F./10 min. | 250° ± 5° F./45 min. | 265° F./30 min. |
| NARMCO T300.5208 | 180° F./50 min. | 310° F./5 min. | 275° ± 5° F./45 min. | 290° F./30 min. |

In chamber 28, laminate 10 is in a "bell jar" type environment. Rigid housing 24 is not affected by the pressure differential on opposite sides thereof, i.e., atmospheric pressure indicated by arrows 33 on the outside of housing 24 and vacuum in chamber 28. As such, pressure tending to compress laminate 10 is precluded. In this regard, laminate 10 is in an equilibrium situation in chamber 28, and with the resin matrix in a liquid state, freedom of air migration is maximized.

By practicing this procedure for substantially eliminating the entrapped air from laminate 10, porosity of the laminate 10 is reduced to a minimum thereby allowing curing thereof without use of an autoclave and the fabrication of a structure which has typical high pressure mechanical properties. However, prior to removal of laminate 10 from apparatus 20, the temperature should be reduced to that of ambient (room temperature) while the vacuum is maintained. This is necessary because with the resin still in a liquid state, exposing the laminate 10 to the atmosphere would likely result in air being partially absorbed by the laminate which would cause an increase in porosity of the laminate. Curing of laminate 10 can then be accomplished after the above step of expelling air therefrom in a standard fashion. Preferably, this would be in a furnace similar to that of apparatus 20 wherein the laminate 10 is enclosed within a vacuum bag in the chamber of the furnace. Compression of the laminate would normally be accomplished by application of vacuum to the environment within the vacuum bag, with positive pressure, normally no greater than atmospheric, in the chamber around the vacuum bag at temperatures required for curing. The apparatus of FIG. 2 could also be adapted for curing of laminate 10 as all that would be necessary would be to apply a vacuum bag around laminate 10 after the outgassing step and have a vacuum line connecting the vacuum bag. Curing of laminate 10 could also be accomplished by the application of low positive pressure (less than 15 psi) by any suitable means such as application of a dead weight or inflatable elastomeric bladders.

While the laminate 10 can be cured after the outgassing operation described above by removing the laminate 10 from the apparatus 20 in FIG. 2, and then conducting the curing by prior art techniques, it is preferred that the outgassing and the curing be accomplished in one operation in the same apparatus. This saves equipment expense, time, requires only one heat cycle, and optimizes the probability of a successful part being fabricated (since the laminate 10 after being outgassed will not be exposed to the atmosphere prior to the curing step). FIGS. 3–6 illustrate an apparatus and technique for accomplishing this.

Figure 3:
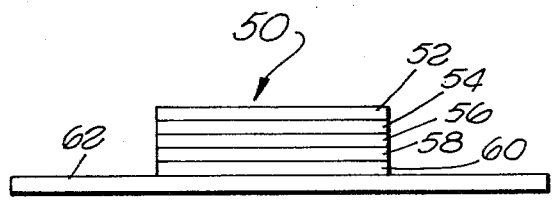
FIGS. 3-6 illustrate schematically the set-up of an apparatus for carrying out in a preferred manner the present invention.
Figure 4:
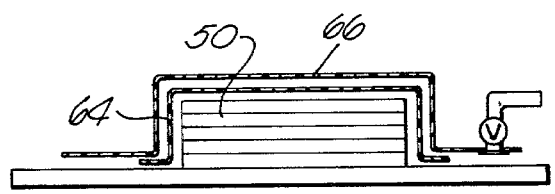
Figure 5:
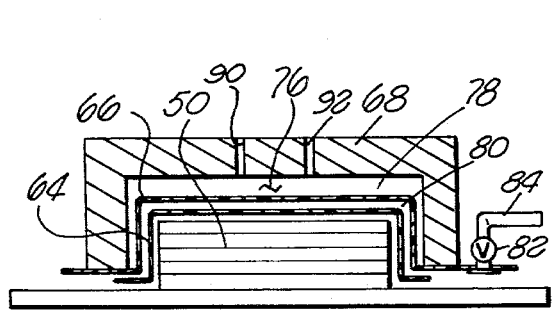
Figure 6:
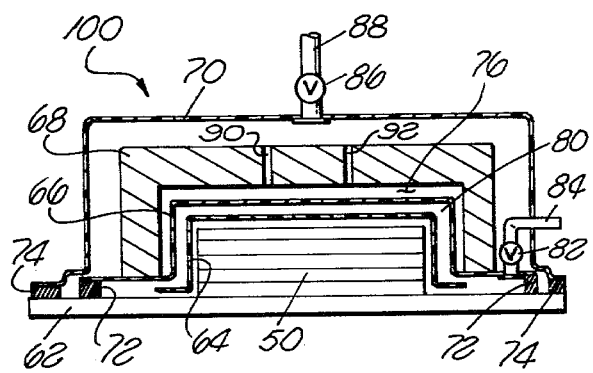

In FIG. 3, there is illustrated a laminate generally indicated at 50 which is similar to the laminate of FIG. 1 except that five plies, 52, 54, 56, 58, and 60, are used. Laminate 50 is positioned on a base plate or caul sheet 62. In FIG. 4, laminate 50 is shown covered by a release or breather layer 64. Layer 64 may comprise any high temperature woven fabric or the like, such as Teflon fabric or Armalon Laminate 50 and layer 64 are sealed within impermeable vacuum bag 66. Vacuum bag 66 is of a plastic material such as nylon in sheet form. As illustrated in FIG. 5, a rigid, preferably metal, housing 68 covers the assembly of the laminate 50, layer 64, and vacuum bag 66. FIG. 6 illustrates the fully assembled apparatus, generally indicated at 100. A second vacuum bag 70 covers housing 68. Vacuum bags 66 and 70 are respectively sealed to base plate 62 by any suitable means, such as sealing tape, as illustrated at 72 and 74, respectively. Within housing 68 is defined a chamber 76. Chamber 76 is divided into two portions by vacuum bag 66, i.e., the area 78 outside of vacuum bag 66 and the environment 80 inside vacuum bag 66. A valve 82 connects through line 84 environment 80 to a vacuum source (not shown). A valve 86 through line 88 connects area 78 through passages 90 and 92 in housing 68 to another source of vacuum (not shown).

In the preferred method, with the set-up shown in FIG. 6, vacuum is applied to environment 80 through valve 82. Vacuum is also applied to area 78 through valve 86. The vacuum applied to area 78 is greater than that applied to environment 80 such that the inner vacuum bag 66 is lifted off of the laminate 50, insuring minimum pressure on laminate 50 and allowing maximum outgassing. Layer 64 allows uniform distribution of vacuum within inner bag 66. During this time, or after applying the vacuum as just mentioned, the laminate is heated (by a source not shown) to within a temperature range wherein the resin matrix exhibits a viscosity which allows air migration through the resin matrix. The laminate 50 is maintained within this temperature range for a time duration sufficient to cause air entrapped in the laminate 50 to be expelled. Such air is drawn by the vacuum in environment 80 through the porous layer 64 from environment 80 and into line 84.

Once outgassing is accomplished, laminate 50 can then be cured. This is accomplished by bringing the laminate 50 to within a temperature range suitable for curing and compressing the laminate as required. The compressive pressure that need be applied for curing for a successful part is substantially reduced over that necessary in the prior art because of the previous outgassing of the entrapped air in the laminate 50. The compressive pressure is applied to laminate 50 by inner bag 66 during curing by virtue of a pressure differential around inner bag 66 caused by increasing the vacuum within environment 80 while venting to atmosphere the area 78.

Prior to raising the temperature to that required for curing, it is preferred that the laminate 50 be compressed as described above while the temperature is maintained within the temperature range used for outgassing for a selected length of time to ensure complete ply consolidation. The temperature is then raised to that necessary for curing utilizing the manufacturer's recommended cure temperature and time.

The following specific examples will serve to further illustrate the practice of the invention.

EXAMPLE I

A laminate of 15 sheets of graphite epoxy having a thickness of 0.12 in. and utilizing the Hercules AS/3501-5A resin was formed in an apparatus such as 20 in FIG. 2. Chamber 28 was evacuated to create a vacuum of 25 inches Hg therein. The laminate was heated to 250° F. These conditions were maintained for 45 minutes, after which temperature was adjusted to ambient while maintaining the vacuum environment. Chamber 28 was vented to atmosphere and the laminate removed from the apparatus. The laminate was found to have minimal porosity.

EXAMPLE II

A laminate having the characteristics set forth in Example I was placed in an apparatus 100 as illustrated in FIG. 6. The laminate was first outgassed by maintaining a vacuum in environment 80 of 25 inches Hg while a vacuum of 28 inches Hg was maintained in area 78. While such vacuum conditions were maintained, the laminate was brought to a temperature of 250° F. These conditions were maintained for 45 minutes. During this time, entrapped air within the laminate was substantially eliminated. While remaining at 250° F., area 78 was vented to atmosphere while the vacuum in environment 80 was increased to 28 inches Hg. Inner vacuum bag 66 was thereby caused to compress the laminate to assure complete ply consolidation. The laminate was then brought to a temperature of about 350° F. These conditions were maintained for about one hour. After this time, temperature was reduced to ambient while maintaining a vacuum environment. Environment 80 was then vented to atmosphere, apparatus 100 disassembled, and the laminate removed. The cured laminate was found to have minimal porosity and typical high pressure (autoclave) cure mechanical properties. As such, the laminate was successfully vacuum cured without use of an autoclave.

Thus it is apparent that there has been provided, in accordance with the invention, a method of fabricating a composite structure that satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and scope of the appended claims.

We claim:

1. A method of fabricating a composite structure comprising the steps of:
positioning in an evacuable chamber a laminate comprising a plurality of plies of fibrous material in an uncured resin matrix, the laminate having air entrapped therein;
applying vacuum to the chamber to create a partial vacuum environment in the chamber;
heating the laminate to within a temperature range wherein the resin matrix exhibits a viscosity which allows air migration through the resin matrix; and
maintaining the laminate within the temperature range and partial vacuum environment for a time duration sufficient to cause a portion of the air entrapped in the laminate to be expelled.

2. The method of claim 1 wherein compressive pressure to the laminate is substantially precluded during said maintaining step.

3. The method of claim 2 wherein the temperature range allows for substantially all the entrapped air to be expelled during said maintaining step.

4. The method of claim 2 wherein the portion of entrapped air expelled is substantial.

5. The method of claim 3 wherein the time duration is sufficient to cause substantially all the entrapped air in the laminate to be expelled.

6. The method of claims 2, 4, or 5 also including the step of curing the laminate.

7. The method of claim 6 wherein said curing is accomplished outside of the chamber.

8. The method of claim 2 wherein the chamber is rigid.

9. The method of claim 6 wherein the chamber is rigid.

10. The method of claim 6 wherein said curing is accomplished within the chamber and comprises:
bringing the laminate to within a temperature range suitable for curing; and
applying compressive pressure to the laminate.

11. The method of claim 2 wherein the laminate is heated to a temperature in the temperature range where the resin matrix exhibits a substantially minimum viscosity, and the temperature is substantially maintained during said maintaining step.

12. The method of claim 6 wherein the laminate is heated to a temperature in the temperature range where the resin matrix exhibits a substantially minimum viscosity, and the temperature is substantially maintained during said maintaining step.

13. The method of claim 10 wherein the laminate is heated to a temperature in the temperature range where the resin matrix exhibits a substantially minimum viscosity, and the temperature is substantially maintained during said maintaining step.

14. The method of claims 2 or 4 wherein the temperature range is about 150° F. to about 310° F.

15. The method of claim 5 wherein the temperature range is about 150° F. to about 290° F.

16. The method of claim 6 also including the following steps prior to said curing step:
bringing the laminate to a temperature below the temperature range while maintaining the partial vacuum environment; and
removing the laminate from the chamber.

17. The method of claim 1 wherein the portion of entrapped air expelled is substantial.

18. A method of fabricating a composite structure comprising the steps of:
positioning in an evacuable rigid chamber a laminate comprising a plurality of plies of fabrous material in an uncured resin matrix, the laminate having air entrapped therein;
positioning in the chamber a flexible sheet, the sheet dividing the chamber into first and second portions, the laminate being positioned in the first chamber portion;
applying vacuum to the first chamber portion to create a partial vacuum environment therein;
heating the laminate to within a temperature range wherein the resin matrix exhibits a viscosity which allows air migration through the resin matrix;
maintaining the laminate within the temperature range and partial vacuum environment for a time duration sufficient to cause a portion of the air entrapped in the laminate to be expelled; and
controlling pressure in the first and second chamber portions during said maintaining step such that compressive pressure on the laminate by the flexible sheet is substantially precluded.

19. The method of claim 18 wherein the portion of entrapped air expelled is substantial.

20. The method of claim 19 also including the step of curing the laminate.

21. The method of claims 19 or 20 wherein during said controlling step vacuum is applied to the second chamber portion which is greater than that applied to the first chamber portion.

22. The method of claim 20 wherein said curing is accomplished within the chamber and comprises:
bringing the laminate to within a temperature range suitable for curing; and
applying compressive pressure to the laminate by the flexible sheet by providing a greater pressure in the second chamber portion relative to the first chamber portion.

23. The method of claim 22 wherein during said controlling step vacuum is applied to the second chamber portion which is greater than that applied to the first chamber portion.

24. The method of claims 22 or 23 wherein during said heating step the laminate is heated to a temperature in the temperature range where the resin matrix exhibits a substantially minimum viscosity, and the temperature is substantially maintained during said maintaining step.

25. The method of claims 22 or 23 wherein compressive pressure is applied during curing by providing a positive pressure in the second chamber portion and a vacuum in the first chamber portion.

26. The method of claim 24 wherein compressive pressure is applied during curing by providing a positive pressure in the second chamber portion and a vacuum in the first chamber portion.

* * * * *